US011402400B2

(12) United States Patent
Shkolnikov et al.

(10) Patent No.: US 11,402,400 B2
(45) Date of Patent: Aug. 2, 2022

(54) PARTITION LIQUID INTO SAMPLES

(71) Applicant: HEWLETT-PACKARD DEVELOPMENT COMPANY, L.P., Spring, TX (US)

(72) Inventors: Viktor Shkolnikov, Palo Alto, CA (US); Adam Higgins, Corvallis, OR (US); Jeffrey A. Nielsen, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 138 days.

(21) Appl. No.: 16/645,384

(22) PCT Filed: Oct. 13, 2017

(86) PCT No.: PCT/US2017/056602
§ 371 (c)(1),
(2) Date: Mar. 6, 2020

(87) PCT Pub. No.: WO2019/074524
PCT Pub. Date: Apr. 18, 2019

(65) Prior Publication Data
US 2020/0284814 A1 Sep. 10, 2020

(51) Int. Cl.
*B01L 3/02* (2006.01)
*G01N 35/10* (2006.01)
(52) U.S. Cl.
CPC ........ *G01N 35/1074* (2013.01); *B01L 3/0268* (2013.01); *G01N 35/1011* (2013.01); *B01L 2200/021* (2013.01); *B01L 2200/025* (2013.01); *B01L 2300/1827* (2013.01)

(58) Field of Classification Search
None
See application file for complete search history.

(56) References Cited

U.S. PATENT DOCUMENTS

| | | | |
|---|---|---|---|
| 6,833,112 B2 * | 12/2004 | Hoummady | B01J 19/0046 422/430 |
| 9,304,065 B2 | 4/2016 | Fowler et al. | |
| 9,555,388 B2 | 1/2017 | Banyai et al. | |
| 9,644,204 B2 | 5/2017 | Hindson et al. | |
| 9,694,361 B2 | 7/2017 | Bharadwaj et al. | |
| 2001/0005489 A1 * | 6/2001 | Roach | B01L 13/02 204/600 |
| 2003/0127333 A1 * | 7/2003 | Lauks | B01L 3/50273 422/50 |
| 2005/0129850 A1 | 6/2005 | Jung | |
| 2006/0070571 A1 | 4/2006 | Garcia | |

(Continued)

OTHER PUBLICATIONS

HOSIC; "Microfluidic Sample Preparation for Single Cell Analysis"; Nov. 16, 2015.

*Primary Examiner* — Brian R Gordon
(74) *Attorney, Agent, or Firm* — Fabian VanCott

(57) ABSTRACT

A system for partitioning a liquid sample, the system including: an ejection device, the ejection device including an array of nozzles, wherein adjacent nozzles are separated by a constant distance in a first axis; and a microfluidics device including: a plurality of intake ports to receive a deposited droplet, wherein pairs of intake ports are separated by the same constant distance in the same first axis such that adjacent nozzles can simultaneously eject droplets to different intake ports.

20 Claims, 5 Drawing Sheets

(56) References Cited

U.S. PATENT DOCUMENTS

| | | |
|---|---|---|
| 2006/0103051 A1 | 5/2006 | Staats |
| 2010/0282609 A1* | 11/2010 | Pollack ............. B01L 3/502792 |
| | | 204/600 |
| 2011/0311409 A1 | 12/2011 | Silverbrook |
| 2012/0164633 A1 | 6/2012 | Laffler |
| 2013/0059366 A1* | 3/2013 | Pollack ............. B01L 3/502715 |
| | | 435/287.2 |
| 2013/0118900 A1* | 5/2013 | Reimitz ........... G01N 27/44782 |
| | | 204/600 |
| 2013/0217103 A1* | 8/2013 | Bauer ....................... B01L 7/54 |
| | | 422/501 |
| 2014/0174926 A1* | 6/2014 | Bort ........................ B81B 1/004 |
| | | 204/601 |
| 2016/0136646 A1 | 5/2016 | Ingber |
| 2016/0274020 A1 | 9/2016 | Winkler |

* cited by examiner

PARTITION LIQUID INTO SAMPLES

BACKGROUND

Sequencing genomic material may be performed using shotgun sequencing. This involves by fragmenting the sequence, sequencing the fragments, for example with chain termination sequencing and/or next generation sequencing, and then reconstructing the whole sequence from the overlaps between fragments. This limits the number of the cycles performed on a given fragment, which reduces the overall time to process a lengthy sequence. This approach also facilitates parallel processing and measurement. This approach may results in multiple measurements, e.g., five to twenty, for each base-pair in the sequence.

BRIEF DESCRIPTION OF THE DRAWINGS

The accompanying drawings illustrate various examples of the principles described herein and are a part of the specification. The illustrated examples do not limit the scope of the claims.

Figure 1:
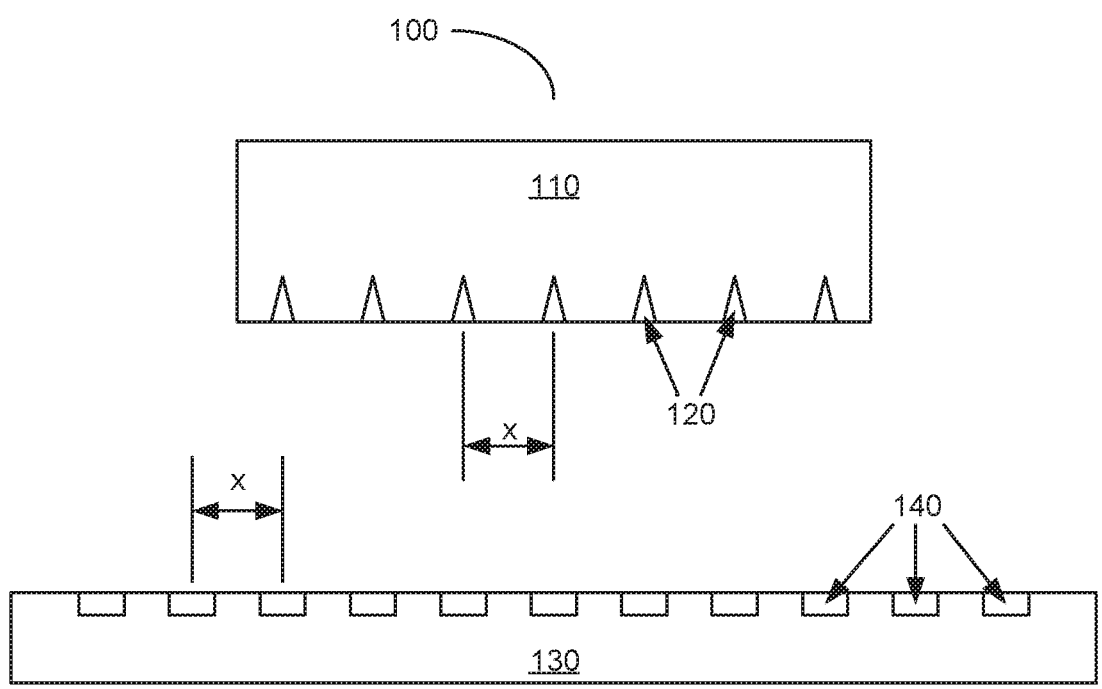
FIG. 1 shows a side view of an example of a system for partitioning a liquid sample according to one example consistent with the present specification.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

DETAILED DESCRIPTION

Shotgun sequencing was a useful advance to sequencing of nucleic acid sequences (such as, DNA and/or RNA sequences). The ability to run sequencing operations in parallel rather than series drastically reduces the time to process longer sequences.

Some populations to be sequenced include more than one nucleic acid sequence. For example, one application is to sequence a population of microorganisms. One could process the entire population using shotgun sequencing. However, the difficulty of reconstructing the fragments into unique sequences becomes increasingly challenging as the number of organisms increases.

As the size of fragments being sequenced decreases, the time to sequence a given fragment also decreases. However, shorter fragments increase the number of matches that to assemble the entire sequence. Shorter fragments also contain less information in the overlap, increasing the probability that some overlaps will be the same, resulting in ambiguity. Nevertheless increasing computing power to reconstruct the sequence allows use of smaller fragments with shorter processing times.

Trying to process multiple sequences simultaneously produces additional difficulties. The multiple sequences may have commonalities in part of the sequence. For example, when trying to sequence a microbiome, some microbes may have identical and/or similar runs. This can make reconstruction of such a complex set of fragments challenging. As an analogy, if putting together a single sequence is similar to assembling a jigsaw puzzle, then putting together a set of sequences is assembling a set of jigsaw puzzles that have been mixed together. Heterogeneity in the biome will make this operation easier, just like different pictures on the puzzles may make solving a set of puzzles easier. However, similar sequences in a biome make reconstruction harder, just like two puzzles of similar subject matter make solving the mixed jigsaw puzzles more challenging.

One solution used is to label the various sequences, for example with radio nuclei, fluorescent, and/or chemical tags. However, this is labor intensive and increases the cost of such technologies. There are also a finite number of discrete tags that can be used. Further, some labeling approaches may limit and/or impede sequencing the fragments.

One challenge with dealing with solutions containing multiple sequences is separating sequences from each other to prevent confounding. An estimate of the concentration of DNA and/or RNA sequences in a solution may be made. This may be performed using absorbance. This may be a chemical measurement. This concentration is used to determine a volume per sequence, which is to say, an inverse of concentration. Next, a fraction of this volume is determined to minimize the capture of two sequences in a sample. For example, if the volume per cell was 50 picoliters, a fraction of 10% may be used for a target sample size of 5 picoliters. In a similar approach, the sample may be diluted or concentrated to obtain a desired sequence probability in a predetermined droplet size provided by an ejector. Dilution may be performed with a saline solution. Dilution may be performed with a solution which contains species for a process to be performed on the droplet.

The solution is provided to an ejection device which includes an array of ejectors. The ejectors have a spacing which corresponds to the spacing between intake port locations on a microfluidic device to process the samples. In an example, the spacing is the measurement from the center of the nozzle of one ejector to a center of a nozzle of an adjacent ejector. This allows the use of multiple ejectors to rapidly place a droplet on a set of intake ports.

In an example, the intake ports are assessed to detect the presence or absence of a sequence. For example, the intake port may detect the presence or absence of the cell on the intake port. This can be performed using a variety of techniques including: optical, UV-VIS absorbance and/or transmission, fluorescence, and electrical techniques. The ejector may be used to provide an additional droplet to intake ports that did not receive a sequence. This process may be repeated until a maximum number of droplets are reached. This process may be repeated until a certain percentage of the intake ports have a sequence on them. The detection or lack of detection of a sequence may be feedback to the ejection device to control which ejectors fire in the second and subsequent rounds.

In a first example, the ejection device in the principle axis of the array of ejectors after loading of the intake ports has been completed. For instance the array of ejectors may be 8 mm in length. After the intake ports are loaded, the array may be moved to new intake ports. In another example, the array of ejection devices dynamically applies droplets to intake ports as the array rasters across the microfluidic device.

The ejection device may move relative to the microfluidic device in an axis orthogonal to the array of ejectors. For example, the microfluidic device may be placed on a stage with Y axis motion (where the direction of the array of ejectors is X). This again facilitates rapid loading of sequences onto the microfluidic device. After motion in Y, a new set of intake ports on the microfluidic device are aligned with the ejectors such that the ejectors may fill a plurality of intake ports simultaneously. In an example, the ejectors load all the intake ports in a row simultaneously. In a second example, the ejectors correspond with every other intake port, every third intake port, every fourth intake port, etc. Again, allowing multiple ejectors to apply droplets to multiple intake ports simultaneously allows time efficient loading of the microfluidic device. In contrast, loading a microfluidic device manually and/or using a robot may take substantially longer, which may in turn, result in evaporation of the deposited droplets before the entire device is loaded. Even assuming multiple tips for a pipetting robot and assuming the ability to deliver single cell containing droplets, the logistics of applying, for example, 10,000 droplets to a device represents would take an unreasonable amount of time. The application time limits the number of samples a microfluidics device can process simultaneously by a chip. This limit on the number a parallel samples in turn impacts the test cost per sample. Assuming 10 pipettes in parallel with a 1 second deposition time, a system would take 1000 seconds or just under 17 minutes to load such a device. Applying up to two additional droplets to intake ports that didn't receive a cell (or sequence) would triple this time. In contrast, an array of droplet ejectors can be used to apply thousands of droplets to a microfluidic device in under a minute.

The ability to verify the presence of a cell or nucleic acid sequence for evaluation also allows the application of multiple droplets without the risk of having multiple cells by using droplets sized to be unable to contain two or more intake ports. For example, if the volume is 10% of the volume per cell. Then, statistically, the first pass will put cells on 10% of the intake ports. The next pass will put cells on 10% of the remaining 90% of the intake ports for an additional 9% of intake ports being loaded. Each pass has fewer new intake ports loaded as already loaded intake ports are excluded, resulting in diminishing returns. However, the ability to rapidly apply a droplet to selected intake ports, based on feedback, allows use of more channels of the microfluidics device. This, in turn, reduces the per sample cost. For example, five passes with a 10% intake port loading rate produces 41% loading. This is four times the usage of a single pass device. And this efficiency is achieved due to the ability to rapidly deposit droplets and the ability to detect loaded intake ports using some technique. In an example, loaded intake ports are identified using an impedance measurement. In an example, loaded intake ports are identified optically. In an example, loaded intake ports are detected by absorbance and/or emission of photons.

Accordingly, this specification describes a system for partitioning a liquid into samples. The samples may be controlled to contain a single cell in each sample, Once the samples are partitioned; additional processing can be performed on the cells.

The single cell samples may be lysed and have their proteins removed. The proteins may be tested. The RNA and/or DNA of the cell may be fragmented and/or sequenced. The DNA; RNA, and/or proteins may be mixed with tags to identify a given sequence and/or combination of sequences. The cells may be evaluated to determine a distribution of a property in the population providing the cells. For example, the cells may be assessed for antibiotic resistance genes, segments, proteins, enzymes, etc, to assess the impact of various antibiotic regimes on the population. This could be done prior to treatment to select an antibiotic with less impact on a patient's gut biome. For example, a sample from a wound site could be assessed to profile the microbial population and identify treatments based on the lack of resistance.

Among other examples, this specification describes a system for partitioning a liquid sample, the system including: an ejection device, the ejection device comprising an array of nozzles, wherein adjacent nozzles are separated by a constant distance in a first axis; and a microfluidics device including: a plurality of intake ports to receive a deposited droplet, wherein pairs of intake ports are separated by the same constant distance in the same first axis such that adjacent nozzles can simultaneously eject droplets to different intake ports.

This specification also describes a method of loading nucleic acid sequences onto a microfluidic device for parallel processing, the method including; filling a reservoir on an ejection device with a solution comprising a plurality of cell types, wherein different cell types have different nucleic acid sequences; ejecting solution from the reservoir using an array of nozzles, wherein adjacent nozzles in the array of nozzles are separated by a fixed distance; and aligning the microfluidic device with the array of nozzles such that droplets fired from adjacent nozzles are deposited on different processing areas of the microfluidic device.

This specification also describes A system for loading material onto a microfluidic device, the system including: an array of nozzles; and a two dimensional array of ports on the microfluidic device, the array of ports positioned to receive droplets from multiple nozzles in the array of nozzles wherein the droplets are ejected simultaneously.

Turning now to the figures, FIG. 1 shows an example of a system (100) for partitioning a liquid sample according to one example consistent with the present specification. The system (100) includes: an ejection device (110), the ejection device comprising an array of nozzles (120), wherein adjacent nozzles (120) are separated by a fixed distance (x) in a first axis; and a microfluidics device (130) including: a plurality of intake ports (140) to receive a deposited droplet, wherein pairs of intake ports (140) are separated by the same fixed distance in the same first axis such that adjacent nozzles (120) can simultaneously eject droplets to different intake ports (140).

The system (100) is a system for partitioning a liquid sample. In an example, the liquid sample contains a plurality of nucleic acid sequences. The sequences may be DNA, RNA, free, and/or in cells. An estimate of the concentration of the sequences in the liquid is made. This may be based on a measurement. For example, the liquid may have its absorbance measured. Measurement may be at a single wavelength and/or a multiple wavelengths. Measurement may be made of a chemical in the solution, Dyes, indicators, markers, etc. may be added to the liquid to aid in estimation of the concentration. Based on the concentration, the liquid may be concentrated and/or diluted. This allows a single size of ejector to have a desired probability of containing a sequence. The ejection device (110) may include ejectors capable of ejecting multiple sizes of droplets.

Ejection device (110) includes a reservoir to hold and distribute the liquid sample. Measurement, dilution, and/or concentration of the liquid sample may be performed prior to loading the sample into the reservoir. In an example, measurement is performed in the ejection device (110). Dilution of the liquid in the reservoir may be performed in the ejection device (110). Concentration of the liquid in the reservoir may be performed in the ejection device (110), for example, using a heater (e.g., a firing resistor) to evaporate liquid and/or using multiple electrodes to perform hydrolysis.

The liquid in the reservoir is fed to a plurality of nozzles (120). Each nozzle may be associated with an actuator and/or ejector. For example, a piezoelectric actuator may be used to eject liquid from a nozzle (120). A gas bubble may be used to eject liquid from a nozzle (120). Pressure systems may be used to eject liquid from a nozzle (120). A heated vapor bubble produced by a heater maybe used to eject liquid from a nozzle (120), as in a thermal inkjet.

The ejection device (110) may have a single size of nozzles. The ejection device may have a plurality of sizes of nozzles (120) arranged in multiple linear arrays. The center of nozzle (120) to center of nozzle (120) spacing of the nozzles (120) in a linear array may be regular. In an example, the spacing is 300, 600, 900, and/or 1200 dots per inch. The center of nozzle (120) to center of nozzle (120) spacing may be 10 to 500 microns. In an example, the center of nozzle (120) spacing to center of nozzle (120) spacing is 21, 42, and/or 84 microns, Multiple linear arrays may have their respective nozzles (120) aligned in the axis perpendicular to the linear array, Multiple linear arrays may have their nozzles (120) offset in the axis perpendicular to the linear array. An array may be selected based on its alignment with the intake ports (140) on the microfluidics device (130).

The ejection device (110) may be capable of motion relative to the microfluidics device (130) which is located to receive ejected liquid from the nozzles. The ejection device (110) may be capable of relative movement in the axis of the array of nozzles (120). The ejection device (110) may be capable of relative motion in the axis perpendicular to the array of nozzles (120). The ejection device (110) may be capable of relative motion in both the axis of the array of nozzles (120) and perpendicular to the axis of the array of nozzles (120).

The microfluidics device (130) includes a plurality of intake ports (140). The microfluidics device (130) may perform a wide variety of operations. For example, the microfluidics device (130) may lyse cells deposited in the intake ports (140). The microfluidics device (130) may separation materials. The microfluidics device (130) may rinse samples, dilute samples, and/or provide a variety of reactants to interact with samples. Microfluidics is a field with continuing development; however, the challenge of isolating samples to different portions of a microfluidics device is addressed by using an ejection (110) device to load the microfluidics device (130).

The microfluidics device (130) includes a plurality of intake ports (140). Each intake port (140) is designed to receive a droplet from the ejection device (110). A given intake port (140) may receive multiple droplets from the ejection device (110).

In an example, the system (100) includes a sensor (303) capable of detecting the presence of a nucleic acid sequence in an intake port (140). For example, if the nucleic acid is a DNA sequence in a cell, the system (100) may be capable of determining the presence and absence of a cell in the intake port (140). The system may use an optical sensor. The system (100) may use an electrical sensor, for example, by detecting impedance between two parts of the intake port. The sensor (303) used to detect the presence of a cell may also be capable of detecting a droplet in the intake port. For example, an optical sensor may output a first value when the intake port (140) is empty; a second value when liquid is present in the intake port (140) without a cell; and a third value when both liquid and a cell are present in the intake port (140). The intake port (140) may include chemical markers and/or indicators which activate in the presence of a sequence. The markers may be general and/or specific, for example, fluorescent in situ hybridization (FISH) markers.

The presence and/or absence of a sequence and/or cell in a specific intake port (140) of the microfluidics device (130) may be provided to a controller (301). The controller (301) may then provide firing instructions to the ejection device (110) to provide an additional drop to intake ports (140) which are missing a target. Depending on the relative time to perform the identification of a sequence in an intake port (140), time to selectively apply the additional droplets, and time to perform the rest of the operations on the microfluidics chip (130), this process can be repeated until a suitable loading of sequences and/or cells is reached, a time limit is reached, and/or a maximum number of droplets applied to an intake port (140) is reached. If detection is sufficiently fast, it may be useful to perform all ejections to a line of intake ports (140) before applying relative movement between the ejector device (110) and the microfluidics device (130) in the axis perpendicular to the axis of the array of nozzles (120) on the ejector device (110).

In another example, a grid of intake ports (140) can each receive droplets. The droplets may be assessed for the presence or absence of a target, for example, a cell, a DNA, RNA, and/or another object of analysis. Once the droplets with targets are identified, the droplets may be combined to place one target in each area for analysis. The droplets may be combined using electrodes in the electrode layer to merge the droplets and align a single target for each processing location.

A line of droplets may be deposited over a set of electrodes. The system may then determine which droplets contain a target sequence and combine the droplets so as to include only a single target sequence. The system may determine the presence of a target in a droplet using a sensor (303) and/or an array of sensors (303).

Figure 2:
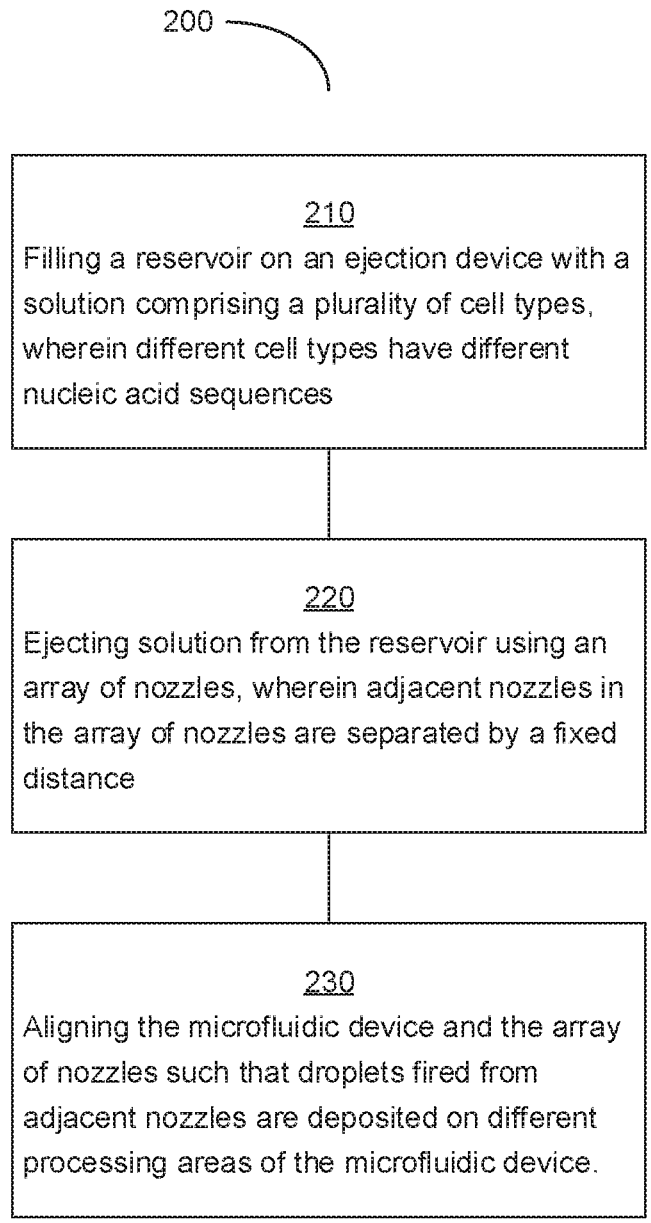
FIG. 2 shows a method of loading material onto a microfluidic device for parallel processing consistent with the present specification.

FIG. 2 shows a method (200) of loading material onto a microfluidic device (130) for parallel processing consistent with the present specification. The method includes: filling a reservoir on an ejection device (110) with a solution comprising a plurality of cell types, wherein different cell types have different nucleic acid sequences (210); ejecting solution from the reservoir using an array of nozzles (120), wherein adjacent nozzles (120) in the array of nozzles (120) are separated by a fixed distance (220); and aligning the microfluidic device (130) and the array of nozzles (120) such that droplets fired from adjacent nozzles (120) are deposited on different input ports (140) of the microfluidic device (130) (230).

The method (200) includes filling a reservoir on an ejection device (110) with a solution comprising a plurality of cell types, wherein different cell types have different nucleic acid sequences (210), The concentration of the solution may be adjusted in the reservoir. The concentration may be decreased by diluting the solution. The concentration may be increased by evaporating or breaking down fluid in the solution, e.g., electrolysis. Evaporation may be enhanced using a heater in the ejection device (110). The heater may be operated to a lower temperature than a temperature used to form an ejection bubble for a nozzle (120) of the ejection device (110), if the device is a thermal inkjet, for example.

The method includes ejecting solution from the reservoir using an array of nozzles (120), wherein adjacent nozzles (120) in the array of nozzles (120) are separated by a constant distance (220). The use of an ejection system (110) with an array of nozzles (120) allows much higher rates of droplet deposition onto a target compared with pipetting and/or similar methods. Ejection also allows the use of small droplets which are unlikely to contain more than a single target for the analysis. In an example, the droplets are approximately 10% of the inverse concentration of the target in the solution. So, if each target has an average of 80 picoliters of associated fluid in the solution, the droplet size would be approximately 8 picoliters.

The size of the deposited droplet may be adjusted. For example, an ejection device (110) may include multiple arrays of nozzles (120) with different sized ejection chambers. The system (100) may determine which array of nozzles (120) to use based on an estimated concentration of the solution. An ejection device (110) may include an ejection chamber with multiple heaters and/or actuators. Heaters and/or actuators may be activated in different combinations and/or independently, to produce different sized droplets form a given nozzle. As discussed above, the concentration of the solution may be adjusted. This may allow the use of single nozzle (120) design and/or a single ejection chamber design. In an example, the concentration of the solution is adjusted to work with one of several nozzles (120) and/or ejection chamber designs. The concentration of the solution may be estimated and the estimate used to select an ejector device (110) to be loaded with the solution. For example, a family of ejector devices (110) with different sizes of ejected droplets may all be compatible with a system allowing the size of the droplet to be controlled based on selecting a particular ejector device (110) design.

The method (200) includes aligning the microfluidic device (130) and the array of nozzles (120) such that droplets fired from adjacent nozzles (120) are deposited on different input ports (140) of the microfluidic device (130) (230). This implies that different input ports (140) on the microfluidic device (130) are separated by the constant distance between adjacent nozzles (120) of the ejector device (110). In an example, the input ports (140) and the nozzles (120) have the same center to center spacing. In an example, the input ports (140) have a center to center spacing which is an integer multiple of the nozzle (120) spacing. In this approach, the ejector device may still move relative to the microfluidic device (130) in the axis of the array of nozzles (120) so as to deposit a droplet in each input port (140). The ejector device (110) may move in a single axis perpendicular to the axis of the array of nozzles (120). Which is to say, the array of nozzles may be, for example, X and the relative motion between the ejector device (110) and the microfluidics device (130) may be in Y, without a motion in the X and/or Z component. The system (100) may align in X between the ejector device (110) and the microfluidic device (130) but then prevent further X motion while loading the microfluidic device (130).

Figure 3:
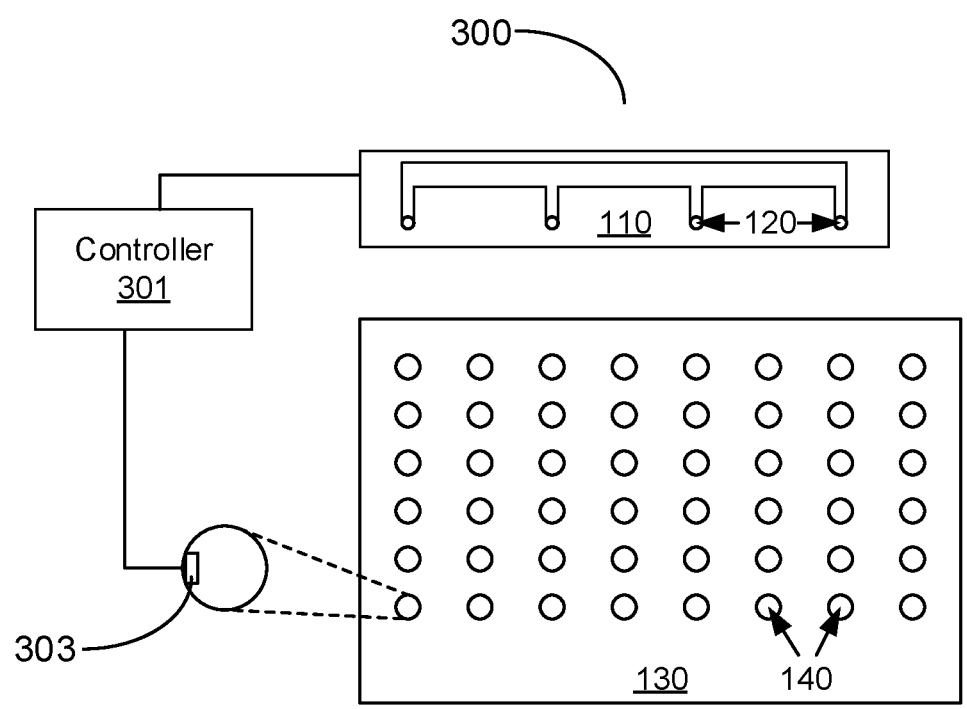
FIG. 3 shows a plan view of an example of a system for partitioning a liquid sample according to one example consistent with the present specification.

FIG. 3 shows a plan view of an example of a system (300) for partitioning a liquid sample according to an example consistent with the present specification. The system (100) includes an ejector device (110) with an array of nozzles (120). The nozzles (120) of the array of nozzles (120) are separated by a constant spacing. The system (100) also includes a microfluidic device (130) with a two dimensional array of input ports (140) to receive droplets from the nozzles (120). The spacing of the input ports (140) is such that multiple nozzles (120) from the array of nozzles (120) are over different input ports (140) at the same time. This allows loading of multiple input ports (140) at the same time by firing multiple nozzles (120).

The ejection device (110) may move in the axis of the array of nozzles (120) relative to the microfluidics device (130). This relative motion may be obtained by moving the ejection device (110), the microfluidics device (130) and/or both. The ejection device (110) may move relative to the microfluidics device (130) in the axis perpendicular to the axis of the array of nozzles (120). This allows a given array of nozzles (120) to load multiple rows of input ports (140) on the microfluidics device (130). By depositing a large number of small droplets, each unlikely to contain more than a single sequence to be analyzed the droplets with sequences can be kept separate. Droplets without a sequence may be merged with a sequence droplet and/or with other non-sequence containing droplets by moving the droplets using electrodes in the electrode layer of the microfluidics device. The approach can allow rapid loading of most and/or all of the channels of the microfluidics device (130), avoiding unused capacity on the microfluidics device, with its associated cost. While depositing, for example, 11 droplets each with a 10% chance to contain a sequence, will likely provide enough sequences in distinct droplets to fill a system, especially as the number of droplets becomes large and the law of large numbers applies. Even a small surplus sequences (e.g., 1%) will likely allow greater than 98% utilization as the number of droplets becomes large. This assumes the ability to shift droplets laterally between columns to move sequence containing droplets to the desired location. If droplets are moved along a single axis, then the probability is lower and equal to 1-(1-deposition probability)^number of droplets. Under such conditions, it may be useful to increase the number of droplets to greater than 10 to decrease the unused percentage of the microfluidics device. For example, twenty droplets (~87% utilization) or fifteen droplets (~80% utilization) provide excellent utilization rates with a 10% sequence probability per droplet.

The system (100) may have the input port (140) to input port (140) spacing in a first axis of the array of input ports (140) on the microfluidic device (130) and the nozzle (120) to nozzle (120) spacing in the array of nozzles (120) is the same. The spacing may be measured center to center to account for any size differences between the nozzle (120) and the input port (140). As discussed above, the use of a common spacing facilitates simultaneous use of multiple nozzles (120) when loading the microfluidic device (130).

The system (100) may be operated so that the received droplets are sized to contain no more than a single cell. As discussed above, multiple droplets can then be merged to provide a cell and/or a sequence to be sequenced on each available portion of the microfluidics device.

Figure 4:
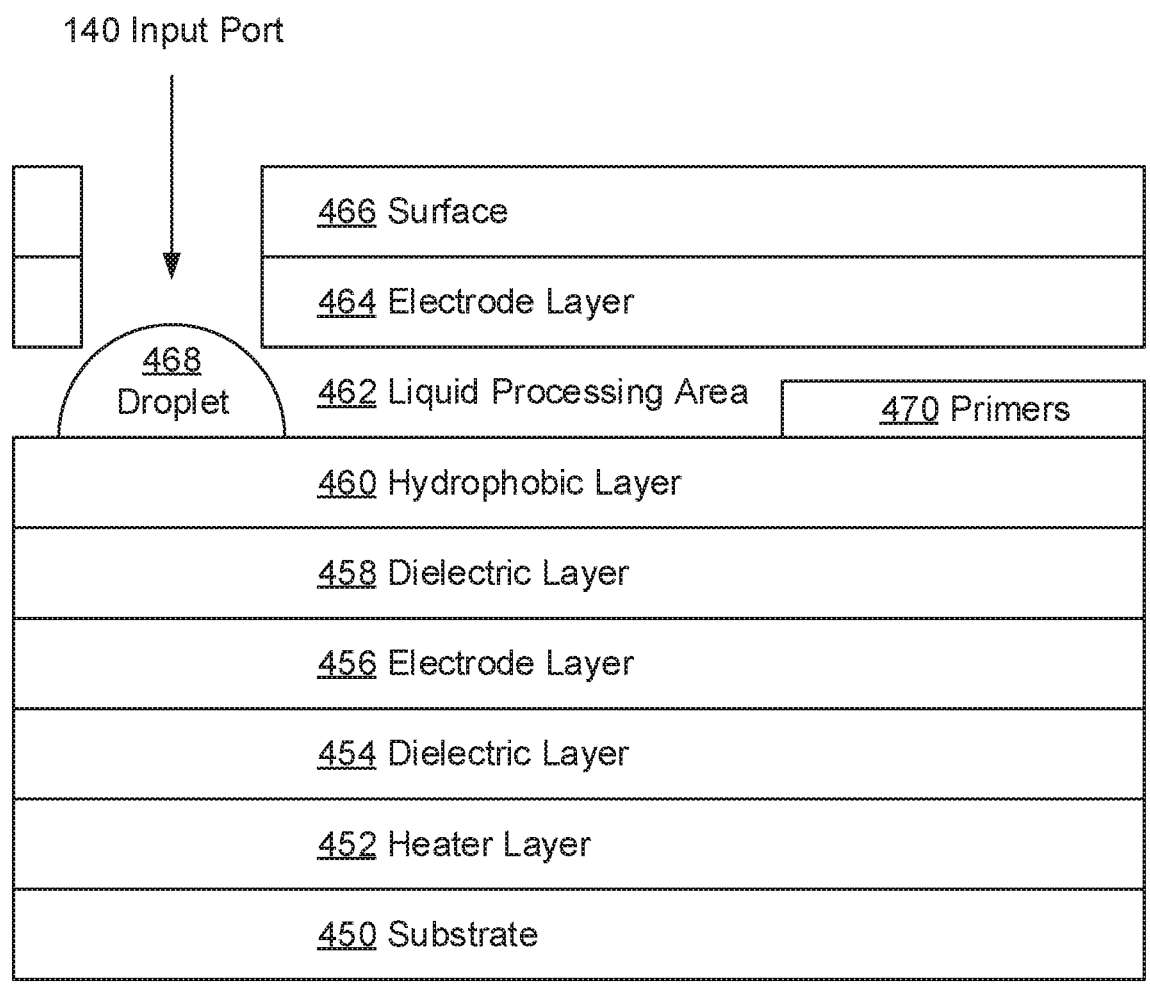
FIG. 4 shows a cross-sectional view of a microfluidic device according to one example consistent with the present specification.

FIG. 4 shows a cross-sectional view of a microfluidic device (130) according to one example consistent with the present specification. The microfluidic device (130) includes a number of layers to control movement of droplets through the device and perform processing operations.

The microfluidic device (130) includes a substrate (450). The substrate may be silicon. The substrate (450) may be glass. The substrate (450) may be a poly-dimethylsiloxane (PDMS), e.g., silicone rubber. The substrate (450) supports a heater layer (452), The heater layer (452) includes heaters. Heaters may be resistive elements. In an example, the heaters include a metal such as tungsten. The heaters may include a metal oxide to provide the desired combination of heat stability, resistance for resistive heating, and strength. The heater layer (452) may also include traces and/or logics to distribute current to the heaters. Current may be provided as direct current and/or waveforms to provide the desired heating. If heating is not being used for any of the reactions, and/or if heating is provided in another manner, e.g., a heat lamp, the heating layer may be omitted.

The heater layer (452) supports a dielectric layer (454). This serves to electrically isolate the heater layer (452) from the electrode layer (456). A wide variety of dielectric materials may be used. SiN and SiC coatings are dielectric materials that may be used separately and/or together to provide the desired insulation between the heater layer (452) and the electrode layer (456). Silicon oxide and/or doped silicon oxide materials may be used depending on the layout of the heaters. The other dielectric layer (458) may be made with the same materials as the first dielectric layer (454). The two dielectric layers may be different materials.

The electrode layer (456) provides the electrical fields to move droplets around the microfluidic device (130), for example, using electrostatic actuation. The electrode layer (456) may include polyimide and copper to facilitate all-terrain droplet actuation (ATDA). The electrode layer (456) includes a large number of electrodes designed to provide the local fields to induce motion of droplets. An upper electrode layer (464) may be used with the electrode layer (456) to maneuver droplets around the microfluidic device (130). The electrode layers (456, 464) may include traces to power the electrodes. The electrode layers (456, 464) may include logics and/or control elements. Adjacent electrodes in an electrode layer (456, 464) may have interdigitating features to facilitate transfer of droplets between adjacent electrodes.

A surface (466) of the microfluidics device may be present. The surface provides insulation of the upper electrode layer (464). The surface (466) may be silicon and/or a glass. The surface (466) may be a polymer and/or a dielectric. In an example, the surface (466) is applied to a stack containing the other layers.

The input ports (140) may be etched into the microfluidic device (130). The input ports (140) allow access to the liquid processing area (462) for material deposited onto the microfluidic device (130).

The hydrophobic layer (460) on the bottom of the liquid processing area (462) helps move the droplets around. A second hydrophobic layer (460-II) may be added to the top of the liquid processing area (462). Specifically, the hydrophobic layer (460) reduces the surface energy and spreading of water containing droplets on in the liquid processing area (462). The hydrophobic layer (460) may be a fluoropolymer. The hydrophobic layer (460) may be silicone. Fluoropolymers and silicones offer a blend of processability, commercial availability, hydrophobicity, and chemical inertness.

Figure 5:
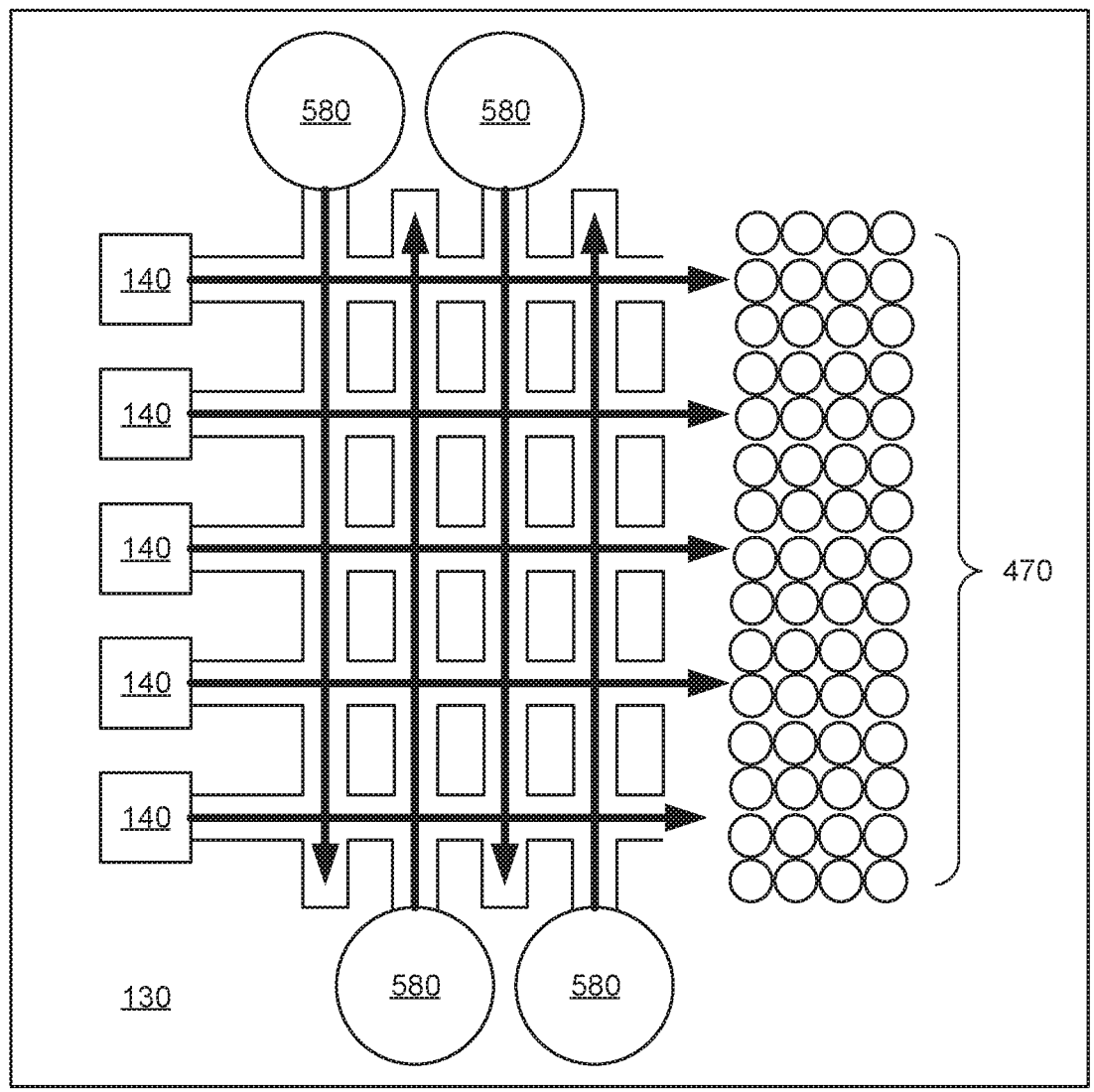
FIG. 5 shows a plan view of a microfluidic device according to one example consistent with the present specification.

FIG. 5 shows a plan view of a microfluidic device (130) according to one example consistent with the present specification. The microfluidic device (130) includes multiple input ports (140) where droplets are deposited from an ejection device. The microfluidic device (130) also includes containers (580) to hold reagents and solutions to perform processing on the microfluidic device (130). The microfluidic device (130) also includes a number of reaction sites (470) the reaction sites may include immobilized materials to perform sequencing operations.

FIG. 5 shows routes of material movement with arrows. Reagents and materials are moved from the containers (580) to interact with the deposited droplets provided to the input ports (140) and moved toward immobilized primers (470). Movement of droplets may be accomplished using digital microfluidics (DMF) electrodes.

The containers (580) may include a wide variety of reagents. For example, a first container (580) may include a lysis reagent to lyse cells. A second container (580) may include a precipitation reagent to remove proteins and/or other interfering species. A third container (580) may contain a ligation buffer. A fourth container (580) may contain ligation adaptors. A deposited droplet containing a cell is moved down the chip, interacting with droplets from the various containers in order to conduct the preprocessing prior to sequencing a sequence from the cell. Containers (580) may contain components to amplify a sequence and/or a portion of the sequence, e.g., primers. Containers (580) may contain reagents to support a wide variety of chemistry on the microfluidic device, for example, enzymes (e.g. polymerase), washes, pH modifiers, buffers, deoxyribonucleotide triphosphate (dNTP), etc.

Each container (580) may include a port to provide the material to the container. In an example, the containers are preloaded with reagents and a removable seal used to prevent fluid from the containers (580) from moving into the liquid processing area (462) until the seal is removed. Multiple containers (580) on the microfluidic device may contain the same reagent; this may facilitate distribution of the reagent to all the reaction sites. A single container (580) may be used for each reagent.

Once the nucleic acid sequence to be processed has been prepared, the droplet containing the sequence is advanced to the primers (470). Bridge amplification may be used to increase the number of copies of each fragment being sequenced. Each of the fragments may be sequenced in parallel, for example, using Illumina dye sequencing. Advantageously, the fragments from a single nucleic acid sequence can be tracked to their placement in the sequencing allowing sequences to be identified by a common source and reducing the computational challenge of multiple nucleic acid sequences being processed simultaneously.

The fragments from a single sequence can be contained to a area of primers. This preserves the common origin of the fragments sequenced in that area of primers. This preserved information simplifies the reconstruction of the sequence while allowing multiple sequences to be processed simultaneously on a device.

It will be appreciated that, within the principles described by this specification, a vast number of variations exist. It should also be appreciated that the examples described are only examples, and are not intended to limit the scope, applicability, or construction of the claims in any way.

What is claimed is:

1. A system for partitioning a liquid sample, the system comprising:
    an ejection device, the ejection device comprising a first array of nozzles, wherein adjacent nozzles are separated by a constant distance in a first axis; and
    a microfluidics device comprising:
        a plurality of intake ports configured to receive droplets deposited from the first array of nozzles, wherein pairs of intake ports of the plurality of intake ports are separated by the same constant distance in the same first axis such that adjacent nozzles can simultaneously eject droplets to different intake ports of the plurality of intake ports;

a plurality of containers fluidically coupled to the plurality of intake ports, each container holding a reagent configured to interact with the deposited droplets; and an electrode layer configured to provide local electrical fields configured to move the deposited droplets around the microfluidics device to interact with the reagents from the plurality of containers.

2. The system of claim 1, wherein the microfluidics device comprises a sensor coupled to an intake port of the plurality of intake ports, the sensor configured to detect a presence of a sequence in a deposited droplet.

3. The system of claim 2, further comprising a controller configured to control the ejection device to determine whether to deposit an additional droplet based on an output of the sensor.

4. The system of claim 1, the microfluidics device further comprising a liquid processing area extending between the plurality of intake ports and a plurality of reaction sites of the microfluidics device wherein:
  the liquid processing area is configured to receive the deposited droplets from the plurality of intake ports; and
  the microfluidics device is configured to sequence part of a nucleic acid sequence in a cell deposited in an intake port of the plurality of intake ports.

5. The system of claim 1, wherein the ejection device comprises a second array of nozzles with adjacent nozzles separated by the constant distance in the first axis.

6. The system of claim 1, wherein the plurality of containers and the plurality of intake ports are arranged such that a flow of reagents from the plurality of containers through the microfluidics device is perpendicular to a flow of deposited droplets from the plurality of intake ports to a plurality of reaction sites of the microfluidics device.

7. The system of claim 1, further comprising a first electrode layer within the microfluidics device configured to transport the deposited droplets from the plurality of intake ports to a plurality of reaction sites of the microfluidic device.

8. The system of claim 7, further comprising a second electrode layer within the microfluidics device, wherein the first electrode layer is below a liquid processing area and the second electrode layer is above the liquid processing area.

9. The system of claim 8, the microfluidics device further comprising a heater layer below the first electrode layer, the heater layer configured to heat the deposited droplets.

10. The system of claim 9, the microfluidics device further comprising a substrate and a surface layer, wherein the first electrode layer, second electrode layer, and heater layer are disposed between the substrate and the surface layer.

11. The system of claim 4, further comprising immobilized primers within the liquid processing area.

12. The system of claim 1, wherein a port to port spacing in a first axis of the plurality of intake ports on the microfluidic device is an integer multiple of a nozzle to nozzle spacing of the first array of nozzles.

13. A method of loading material onto a microfluidic device for parallel processing, the method comprising:
  filling a reservoir on an ejection device with a solution comprising a plurality of cell types, wherein different cell types have different nucleic acid sequences;
  ejecting the solution from the reservoir using an array of nozzles into a first row of intake ports, wherein adjacent nozzles in the array of nozzles are separated by a constant distance;
  detecting a presence of a cell in intake ports of the first row of intake ports;
  responsive to detecting the presence of the cell in a predetermined percentage of intake ports of the first row of intake ports, moving the microfluidic device and the array of nozzles to align with a second row of intake ports; and
  ejecting the solution from the reservoir using the array of nozzles into the second row of intake ports of the microfluidic device.

14. The method of claim 13, further comprising moving reagents from containers of the microfluidic device to interact with the solution from the first row of intake ports and the second row of intake ports.

15. The method of claim 13, further comprising sequencing, in a plurality of reaction sites of the microfluidic device, nucleic acid fragments using liquid from multiple containers of the microfluidic device.

16. The method of claim 13, wherein moving the microfluidic device comprises moving the microfluidic device along an axis orthogonal to a solution ejection direction from the array of nozzles to the first and second rows of intake ports.

17. A system comprising:
  an array of nozzles; and
  a microfluidic device comprising:
    a plurality of intake ports on the microfluidic device, the plurality of intake ports positioned and configured to receive droplets from multiple nozzles in the array of nozzles, which droplets are ejected simultaneously;
    a plurality of containers, separate from and fluidically coupled to the plurality of intake ports, each container:
      holding a reagent configured to interact with droplets deposited from the array of nazzles to the plurality of intake ports; and
      comprising a container port configured to receive the reagent;
    a liquid processing area configured to receive deposited droplets from the plurality of intake ports;
    an upper electrode layer above the liquid processing area; and
    a lower electrode layer below the liquid processing area, the electrode layers configured to:
      provide local electrical fields configured to move deposited droplets around the microfluidic device to interact with the reagents in the plurality of containers; and
      combine the deposited droplets to merge the deposited droplets.

18. The system of claim 17, wherein a port to port spacing in a first axis of the plurality of intake ports on the microfluidic device and a nozzle to nozzle spacing in the array of nozzles are the same.

19. The system of claim 17, wherein the microfluidic device further comprises an electrode layer underneath an intake port of the plurality of intake ports, the electrode layer configured to move the deposited droplets from the plurality of intake ports and plurality of containers to a plurality of reaction sites of the microfluidic device.

20. The system of claim 17, wherein an intake port of the plurality of intake ports is configured to detect the presence of a cell in the deposited droplets.

* * * * *